UNITED STATES PATENT OFFICE.

HENRY CARMICHAEL, OF MALDEN, MASSACHUSETTS.

PROCESS OF MANUFACTURING FIBER-WARE.

SPECIFICATION forming part of Letters Patent No. 568,518, dated September 29, 1896.

Application filed July 12, 1894. Serial No. 517,339. (No specimens.)

*To all whom it may concern:*

Be it known that I, HENRY CARMICHAEL, residing in Malden, in the county of Middlesex and State of Massachusetts, have invented an Improvement in Processes of Manufacturing Fiber-Ware, of which the following description is a specification.

This invention relates to a novel method for manufacturing waterproof fiber-ware.

Prior to this invention I am aware that fiber-ware, such, for instance, as tubs, pails, artificial boards, and the like, have been made waterproof or impervious, either by immersing the dry and finished article in a suitable bath of waterproofing material, with or without subsequent baking, or by the introduction of a size composed of resin or a compound thereof to the fluid pulp, before the water of the latter is expressed therefrom. In this latter process the resin in a state of fine division is mechanically mixed with the fluid pulp in an apparatus commonly called a "beater," and is gradually spread through the fluid pulp by the action of the beater-knives and remains in the fiber of the pulp as originally made on the wet machine. In some instances the resin or a compound thereof is deposited upon the fiber by chemical action, which is usually effected by the introduction into the beater, together with the fiber-stock, of the resin in the form of a soluble salt, which resin is precipitated by alum, aluminium sulfate, or other mordant.

My present invention is more particularly an improvement upon that process above referred to, in which the resin or waterproofing material is mechanically mixed with the fluid pulp; and the said invention has for its object to effect the mixture of the resin or its compounds with the fluid pulp in a more effective manner, so that the said mixture is rendered better adapted for the manufacture of that class of fiber-ware requiring in its manufacture machinery having delicate parts, such, for instance, as high-pressure presses having foraminous coverings for the perforated dies, by which the articles are shaped, and such, for instance, as shown and described in United States Patent No. 503,738, granted to me August 22, 1893, to which reference may be had.

In accordance with this invention the resin or resinous mixture is incorporated with the fluid pulp and heated to its melting-point, which may and preferably will be effected by blowing steam into the fluid mixture of pulp and waterproofing material. The resin or resinous mixture being heated to its melting-point is in a condition to be more thoroughly disseminated among or incorporated with and coated upon the pulp fibers, and, as a result, a superior incorporation or mixture of the resin or resinous compounds and the pulp fiber is effected. This step of my improved process effects the desired mixing of the resin and pulp fiber, but in its heated state the said mixture is not in a desirable condition to pass to the machinery or presses, for if the mixture of fluid pulp and resin in its heated state above described should be delivered by the pumps to the high-pressure presses in which the desired article is to be formed the delicate parts of the machinery, such as the foraminous covering of the perforated dies, would become clogged and rendered inoperative by the viscous resinous material. To avoid this result, the heated mixture of pulp and resinous material is cooled, preferably, by the addition of cold water, to a temperature at which the resinous material is practically solid, and when in this condition the mixture of fluid pulp and resinous material may be delivered to the forming machinery or high-pressure presses without danger of deranging or rendering inoperative the delicate parts of the same. By this improved method of treatment a considerable saving in time is effected in pressing ground wood and other pulps, as practice has demonstrated that the water is more readily expressed than if unsized pulp is used. To illustrate, in the manufacture of thick articles, such as burial-caskets and the like, ten minutes may be saved in the pressing of each casket.

The waterproofing material may and preferably will be made of colophony or common resin tempered with a preferably drying-oil or with a hydrocarbon, such as ozocerite or paraffin, or, when the color is not objectionable, with asphaltum, for common resin in most instances is too brittle to be used alone.

The article after leaving the press or forming-machine may be treated after the manner now commonly practiced, that is, it may be removed to a drying-oven for the evaporation of water, and then preferably to a baking-oven, in which it is subjected to a higher temperature than the drying-oven, but good results may also be secured by conducting the drying and baking in one oven.

The article, after the above treatment, may be given a bath of oil treatment with baking for more effectually closing the pores and forming an article having a more solid and rind-like impervious outer portion in contradistinction to a coating or enamel.

For many articles requiring greater solidity or a decorated surface the sized material after drying and baking as above described may be subjected to heavy pressure, as, for instance, between steel dies or by passing, if in sheet form, through rolls, and while under pressure the material must be at a temperature sufficiently high to soften the resinous material. This may be accomplished by heating the dies or rolls or by heating the sized material before subjecting to pressure.

The amount of resinous material incorporated with the pulp depends largely upon the service required. If the article is merely to shed water, a small percentage of resinous material will suffice, but if the product is to withstand for long periods the action of fluids then the amount of treatment or resinous material is preferably made nearly equal to the weight of fiber estimated in a dry state.

I claim—

1. The improved process of manufacturing fiber-ware, which consists in heating a mixture of fluid pulp and fusible waterproofing material to a temperature approximately equal to the melting-point of the fusible material and subsequently cooling the heated mixture below the said melting-point, whereby the waterproofing material is more thoroughly disseminated, for the purpose specified.

2. The improved process of manufacturing fiber-ware, which consists in heating a mixture of fluid pulp and fusible waterproofing material to a temperature approximately equal to the melting-point of the fusible material, cooling the heated mixture below the said melting-point, pressing the fluid mixture into the form of the article desired, and then drying and baking the fibrous article thus formed, substantially as described.

3. The improved process of manufacturing fiber-ware, which consists in heating a mixture of fluid pulp and fusible waterproofing material to a temperature approximately equal to the melting-point of the fusible material, cooling the heated mixture below the said melting-point, pressing the fluid mixture into the form of the article desired, drying and baking the article thus formed, and subjecting the same to pressure at a temperature approximately equal to the melting-point of the said fusible material, for the purpose specified.

4. The improved process of manufacture of fiber-ware, which consists in mechanically incorporating resin or a resinous mixture with fluid pulp, heating the said mixture to approximately the melting-point of the resin, pressing the pulp into the form of the article desired, drying the said article, and subsequently treating the dried article to an oil treatment to form a solid and rind-like impervious outer portion, substantially as described.

In testimony whereof I have signed my name to this specification in the presence of two subscribing witnesses.

HENRY CARMICHAEL.

Witnesses:
JAS. H. CHURCHILL,
J. MURPHY.